July 15, 1958 E. R. WORTHEN 2,843,301
STORAGE RECEPTACLE AND ATTACHMENT MEANS THEREFOR
Filed Sept. 13, 1956
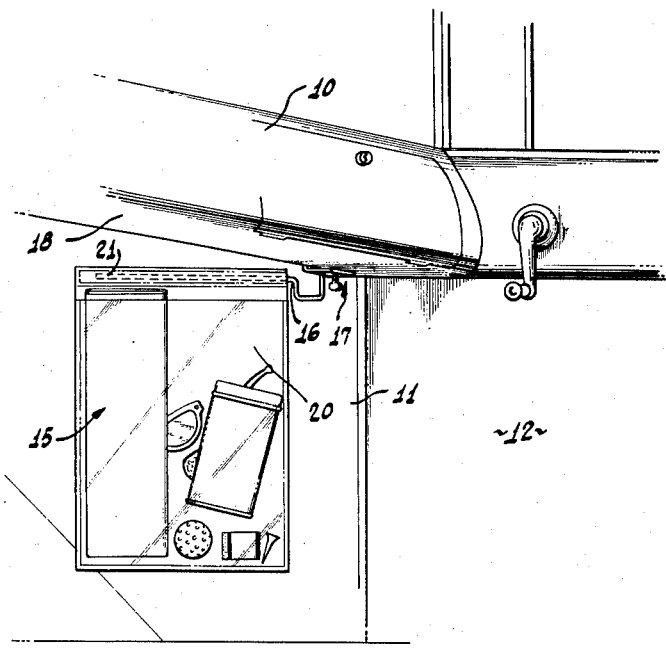
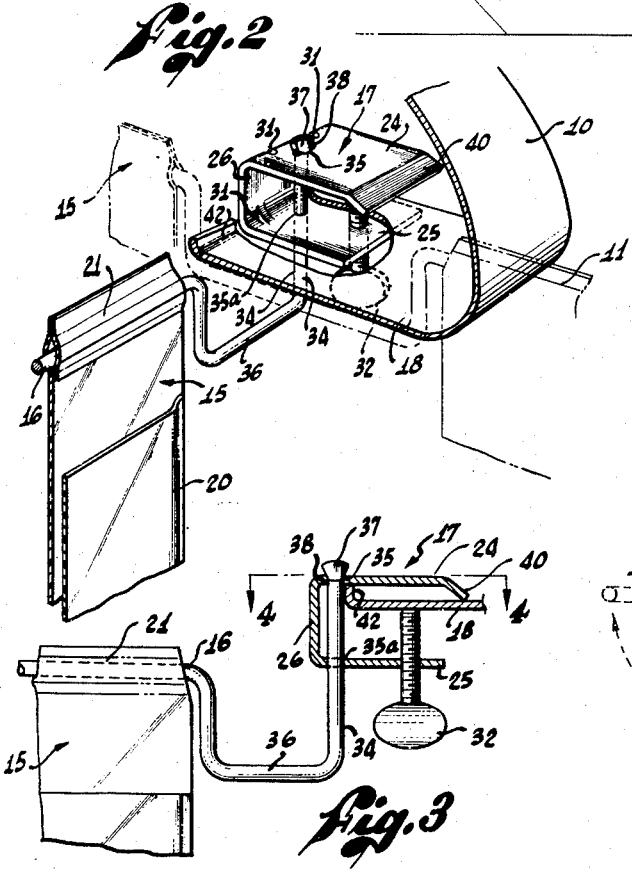
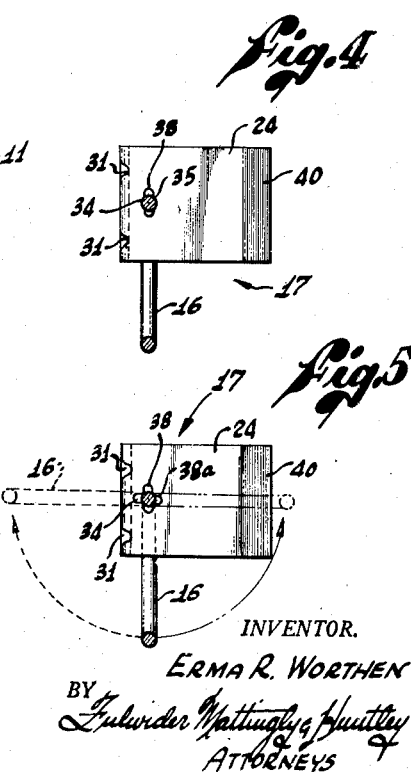
INVENTOR.
ERMA R. WORTHEN

United States Patent Office 2,843,301
Patented July 15, 1958

2,843,301

STORAGE RECEPTACLE AND ATTACHMENT MEANS THEREFOR

Erma R. Worthen, Los Angeles, Calif.

Application September 13, 1956, Serial No. 609,639

5 Claims. (Cl. 224—42.45)

This invention relates generally to a storage or waste disposal receptacle, and more particularly to such a device which is particularly adapted for use in an automobile or the like, and is a continuation-in-part of my co-pending application Serial No. 447,117, filed August 2, 1954.

In automobile travel there are numerous and miscellaneous items which the travelers wish to have readily accessible, and at the same time protected from damage or loss. These items include such things as maps, sun glasses, candy, baby bottles and many other articles of a like character. While a small glove compartment may be provided in the dash board for storage of such things, these compartments are not large enough nor convenient enough for all purpose use. In addition, there are such items as soiled tissues, wet rags, and other waste which are usually thrown out of the car for lack of a place to store them until they can be permanently discarded. Extensive national campaigns are now being carried out to improve the cleanliness of our highways and streets, and avoid unsightly litter and debris on the countryside, and these campaigns emphasize the need and desirability for a means for temporarily storing waste within the automobile.

With the foregoing in mind, it is a major object of the present invention to provide a storage receptacle which is particularly advantageous for use in an automobile.

An equally important object of the invention is to provide a storage receptacle which includes a flexible waterproof bag mounted in such a manner that it may be moved from an exposed position for use to an out-of-the-way position when not in use.

An additional object of the invention is to provide a supporting arm for pivotally moving the storage bag from a position beneath the dashboard of a motor vehicle to a position exposed from beneath the dashboard, for use.

Another object of the present invention is to provide a flexible waterproof bag for use in a vehicle mounted in such a manner that it may be locked to prevent any swinging action thereof while the vehicle is in motion and may be readily pivotally moved from the locked position when desired.

It is still another object of the present invention to provide a flexible waterproof bag that can be locked in an out-of-the-way position when not in use, and may be locked in an exposed position for use, and may be readily swung between each of the locked positions.

A further object of the invention is to provide a strong and economical bag of the character described which is designed to be easily removed for dumping and cleaning.

It is still another object of the invention to provide attachment means which are adapted for universal installation in all makes and models of automobiles and as quickly and easily secured in place.

It is a further object of the present invention to provide an attachment means including a clamp having an angled lip for locking the clamp firmly to a vehicle flange.

A still further object of the invention is to provide a storage bag and attachment means of the character described which can be economically manufactured and sold at a nominal cost.

These and other objects and advantages of the invention will become apparent from the following detailed description of a preferred form thereof and from an inspection of the accompanying drawings in which:

Figure 1 is a perspective view of the interior of a motor vehicle showing a preferred embodiment of my invention installed therein;

Figure 2 is a perspective detail of the attaching and supporting means;

Figure 3 is a view taken along the line 3—3 of Figure 2;

Figure 4 is a view taken along the line 4—4 of Figure 3; and

Figure 5 is a top view of a modified form of the clamping means of my invention.

Referring now to the drawings and particularly to Figure 1 thereof, the numeral 10 designates a conventional dashboard or instrument panel of a motor vehicle which is joined to a side panel 11 adjacent the vehicle door 12. Preferably, the storage receptacle embodying this invention is installed in the space beneath dashboard 10 at the right hand side of the vehicle. It is to be understood however, that its installation is not so limited and it may be placed wherever convenient and desirable.

As illustrated the preferred storage receptacle includes a relatively large rectangular bag 15 suspended vertically upon a horizontal upper supporting arm 16. Attachment means in the form of a clamp 17 are connected to the arm 16 and adapted to be connected to any projecting flange found in the body structure of the vehicle. Normally, such a flange is found on the bottom forward edge of dashboard 16 and the receptacle is desirably mounted thereon. The bag 15 is formed with front and back walls defining a pocket 20 which is open at the top edge and closed along the sides and bottom. Above pocket 20, bag 15 has a horizontal sleeve 21 adapted to fit slideably over supporting arm 16.

Preferably, bag 15 is formed of a flexible plastic material which is waterproof and fire-resistant. Use of a semitransparent material permits visual observation of the contents of the bag, and is quite advantageous when the bag is used for the storage of miscellaneous items. Heat molded seams along the edges of the bag may be economically formed and are strong and tear resistant. By forming bag 15 of such construction, it is well adapted to serve either as a container for miscellaneous travel articles, or as a receptacle for the storage of wet or dirty articles such as waste papers, fruit peels or the like. In other words, the bag may function as a temporary container for general refuse until a convenient refuse dump is reached. Use of the invention will thus eliminate the unsightly and undesirable highway conditions caused by the discard of refuse from traveling vehicles.

As is best seen in Figure 2, the attaching clamp 17 is of U-shape having an upper side wall 24 and a lower side wall 25 joined together by a short back wall 26. The open end of clamp 17 is thus adapted to fit over the flange 18 formed on the bottom edge of dashboard 10. Clamp 17 is typically formed of stamped sheet metal and in order to have greater rigidity has stamped corner braces or ribs 31 which are pressed inwardly from the wall material at the junction of both walls 24 and 25 with back wall 26.

To secure clamp 17 in place, a thumb screw 32 is threaded upwardly through lower wall 25 and is adapted to bear upwardly against flange 18 as is best seen in Figures 2 and 3. As screw 32 is advanced, upper wall 24 is brought down against flange 18 in tight frictional engagement. Between screw 32 and back wall 26 a vertically extending end shaft 34 formed on arm 16 is passed through openings 35, and 35a provided in walls 24 and 25 respectively and is rotatably journaled by said walls for pivotal movement in a horizontal plane.

It will be noted that the shaft 34 is substantially parallel to the back wall 26 and is immediately adjacent thereto in order that the walls 24 and 25 overlap the flange 18 as much as possible. By this means, the possibility of the U-shaped member being displaced, due to severe motion from the flange 18 is minimized.

Before reaching shaft 34, the arm 16 is bent downwardly and then upwardly in a U-shaped turn 36 so that the main portion of arm 16 extends horizontally, but is spaced below the lower clamp wall 25. This construction allows arm 16 to pass freely beneath dash flange 18 so that bag 15 may be swung forwardly as indicated in Figure 2 for convenience when not in use.

Means are provided for locking the arm 16 with respect to the dashboard 10 of the vehicle, one preferred form being shown herein. The upper end of the shaft 34 is flattened and enlarged laterally in the vertical plane passing through the longitudinal axis of the arm 16 to form an upwardly flared head 37 which seats in an elongated cavity or slot 38 provided in the upper wall 24 extending radially outward from the upper opening 35. Upon engagement of the head 37 with the cavity 38, the shaft 34 is prevented from sliding down through the clamp 17 and is also prevented from any movement in a sideways direction. The axis of the elongated cavity 36 lies preferably approximately parallel to the dashboard 10 so that the arm 16, and the flexible bag 15 attached thereto, assumes a position generally parallel to the dashboard when locked in the cavity as above-described. In this position, shown in Figure 2, the bag 15 is conveniently accessible.

It can be seen that in order to move the bag 15 from the exposed locked position of Figure 2, forwardly to an out of the way non-exposed position, a slight upward force need only be exerted on the arm 16, preferably in the region of the U-shaped turn 36, thereby disengaging the head 37 of the shaft 34 from the cavity 38 and allowing the bag 15 to swing freely forwardly to the non-exposed position. Conversely, in order to lock the bag 15 in the exposed position of Figure 2, the arm 16 is swung in the plane of the axis of the cavity 38 until the flattened end 35 of the shaft 34 is automatically seated therein due to the weight of the bag and the contents thereof.

It is to be further noted that the radially extending elongated cavity 38 of wall 24 may be formed having any desired direction, the direction depending primarily upon the particular locked position of the bag 15 desired.

A modified form of the clamp 17 is shown in Figure 4 having a second radially extending cavity or slot 38a formed in the upper wall 24 normal to the first cavity 38. The second cavity 38a is identical in shape to the cavity 38 and is provided so that when the arm 16 is swung forwardly to extend approximately parallel with the vehicle side panel 11, the flattened head 37 of the shaft 34 will drop into the cavity 38a to be thereby locked and prevented from further rotation upon the turning, jostling, or other movement of the vehicle. In this last mentioned position, the bag 15 is substantially prevented from interfering with the normal foot room in the vehicle.

When the bag 15 is to be used in conjunction with the modified form shown in Figure 5, the head 37 is raised from within the cavity 38a by slight upward force applied preferably in the region of the U-turn 36, as described previously, and swung forwardly until the head seats within cavity 38. In this position the bag 15 is conveniently accessible, as described previously.

When the bag 15 is to be emptied, it is removed from arm 16 by sliding sleeve 21 therefrom without disturbing the attachment of clamp 17 on flange 30.

The shaft 34 is positioned immediately adjacent the back clamp wall 26 and is spaced a minimum distance from the edge of flange 18 as indicated in Figure 3, to thereby hold the clamp 17 as stably as possible against side to side rocking or twisting motion. However, the normal pivotal movement of arm 16 may tend to rock the clamp 17 with it so that screw 32 might become loosened.

For these reasons, I provide an angular lip 40 adapted to bite firmly into flange 18 and prevent any rocking movement of the clamp 17. As the screw 32 is tightened, the lip 40 is driven into the material of the flange 18 to stake clamp 17 against movement. The construction of the lip 40 is of low cost, since it is formed in the same stamping operation that the remainder of the clamp 17 is shaped.

In most vehicles, the rear edge of the flange 18 of the dashboard 10 is blunted by being turned upwardly to form a bead 42. The bead 42, so formed, also reinforces the flange 18 of the dashboard 10. Even if the clamp 17 should be loosened, due to severe rocking or other movement, the lip 40 will bear against the upraised bead 42, to effectively prevent the clamp 17 from falling from the dashboard 10.

While I have thus described in some detail a preferred embodiment of my invention, it will be understood that modifications of design and construction can be made without departing from the invention. Therefore, I do not wish to be restricted, except as defined in the appended claims.

I claim:

1. A clamp adapted for installation in the interior of a moving vehicle and adapted to support a bag which comprises: a U-shaped member adapted to fit over the bottom forwardly projecting flange of the dashboard of the vehicle; an arm extending through said clamp and rotatably journaled therein for pivotal movement in a horizontal plane, said arm projecting downwardly and thence horizontally so as to pass freely beneath said flange; an enlarged head affixed to the top of said arm adjacent said upper side wall; and at least one cavity provided in said upper side wall, one cavity being so positioned as to engage said enlarged head to prevent the pivotal movement of said arm when said arm is in an exposed position.

2. A storage receptacle support adapted for installation in the interior of a vehicle beneath the dashboard thereof, which includes: an attachment clamp having a U-shaped body adapted to fit over the bottom forwardly projecting flange of the dashboard having an angular flange on the upper side projecting downwardly toward the dashboard flange, and on the lower side, having a thumbscrew threadably engaged therein for bearing against the underside of said flange to force said angular lip into said dashboard flange to thereby lock said clamp securely thereon; a generally horizontally extending arm having an end portion extending through vertically aligned openings in said upper and lower side walls of said clamp, and rotatably journaled therein for pivotal movement in a horizontal plane from an exposed position when in use to a non-exposed position when not in use, the top of said end portion of said arm being adjacent said upper side wall; a flattened enlarged head integrally secured to the top of said end portion; and at least two slots formed in said upper side wall, each extending radially from said opening in said upper side wall whereby the enlarged head conformingly engages one of said slots to be seated therein when said arm reaches each of said exposed and non-exposed positions thereby to be locked in place, an upward force on said arm causing disengagement of said head with each of said slots to permit pivotal movement of said arm.

3. A clamp adapted for installation in the interior of a vehicle and adapted to support a bag which comprises: a U-shaped member adapted to fit over an interior projecting flange of the vehicle body, said member having an upper and a lower side wall joined by a back wall; an arm extending through said upper and lower side walls of said clamp and rotatably journaled therein for pivotal movement and adapted to support said bag, said bag being thus movable with said arm from a position for use to a position adjacent the vehicle structure when not in use; and a means for locking the pivotal movement of said arm in at least one of said positions, said locking means comprising an enlarged head, affixed to said arm, and extending through said clamp, said head adapted to seat in at least one conforming cavity provided in the upper side wall of said clamp to thereby lock said arm.

4. A clamp adapted for installation in the interior of a vehicle and adapted to support a bag which comprises: a U-shaped member adapted to fit over an interior projecting flange of the vehicle body, said member having an upper and a lower side wall joined by a back wall; an arm extending through said upper and lower side walls of said clamp and rotatably journaled therein for pivotal movement and adapted to support said bag, said bag being thus movable with said arm from a position for use to a position adjacent the vehicle structure when not in use; and a means for locking the pivotal movement of said arm in at least one of said positions, said locking means comprising an enlarged head affixed to said arm, said head adapted to seat in a wall of said clamp to thereby lock said arm.

5. A clamp adapted for installation in the interior of a vehicle and adapted to support a receptacle, which comprises: a U-shaped member adapted to fit over an interior projecting flange of the vehicle body, said member having an upper and a lower side wall joined by a back wall; an arm extending through said upper and lower side walls of said clamp and rotatably journaled therein for pivotal movement and adapted to support said receptacle, said receptacle being thus movable with said arm from a position for use to a position adjacent the vehicle structure when not in use; means for automatically seating said arm within said clamp as said arm is pivotally rotated to one of said positions to thereby prevent further rotation; and means for unlocking said arm for rotation actuated by a slight upward pressure exerted thereon.

References Cited in the file of this patent

UNITED STATES PATENTS

| | | |
|---|---|---|
| 1,862,661 | Cohen | June 14, 1932 |
| 2,458,967 | Wiedenhoeft | Jan. 11, 1949 |
| 2,678,792 | Gallion et al. | May 18, 1954 |
| 2,726,477 | Firkins | Dec. 13, 1955 |